United States Patent [19]

Kozyrski et al.

[11] Patent Number: 4,892,020
[45] Date of Patent: Jan. 9, 1990

[54] WORKPIECE SUPPORT SYSTEM FOR CUTTING MACHINE

[75] Inventors: Vincent T. Kozyrski, Plainville; Alan R. Peters, Milford, both of Conn.

[73] Assignee: The Fletcher-Terry Company, Farmington, Conn.

[21] Appl. No.: 216,899

[22] Filed: Jul. 8, 1988

[51] Int. Cl.⁴ .............................................. B26D 7/02
[52] U.S. Cl. ........................................ 83/463; 83/468; 83/614; 83/879; 225/965; 269/236
[58] Field of Search .................. 269/235, 236, 229; 83/463, 454, 745, 574, 614, 455, 743, 886, 879, 468, 467 R; 225/105, 96.5

[56] References Cited

U.S. PATENT DOCUMENTS

2,095,037 10/1937 Reintjes ........................... 269/235 X
2,531,149 11/1950 Melchor ............................... 83/455
2,655,956 10/1953 Taylor ............................... 83/745 X
3,283,790 11/1966 Striebig ............................. 83/574 X
3,570,734 3/1971 Allen ..................................... 225/104
4,545,515 10/1985 Kozyrski ............................ 225/96.5

Primary Examiner—Frank T. Yost
Assistant Examiner—Rinaldi Rada
Attorney, Agent, or Firm—Ira S. Dorman

[57] ABSTRACT

A wall-mounted support system for a sheet-cutting machine employs a workpiece clamping unit, and a set of rack units to provide endwise support for the workpiece. The clamping unit is comprised of confronting, elongated members of U-shaped cross section, connected by pairs of identical pivot arm components which are, in turn, assembled with pins that provide bearing elements. The rack units incorporate leveling bars, the attitudes of each of which is adjusted by use of an eccentric fixture.

20 Claims, 4 Drawing Sheets

WORKPIECE SUPPORT SYSTEM FOR CUTTING MACHINE

BACKGROUND OF THE INVENTION

Wall-mounted machines for cutting glass, plastic and mat are described, for example, in Kozyrski U.S. Pat. No. 4,545,515, issued Oct. 8, 1985. The Kozyrski machines includes a frame-like structure having horizontal racks, or shelves, for supporting the workpiece on edge. The shelves normally incorporate leveling bars to enable fine adjustment of the attitude of the workpiece, thereby ensuring that the cuts made with the machine will be true and square. The Kozyrski machine also includes a clamping bar for holding the material being cut against the vertical backing components provided. Such a clamp will typically be made from a length of stock, obliquely slotted and freely supported on studs, so as to bear inwardly against the sheet under its own weight. Although the support system shown in the patent has proven to be entirely adequate for its intended purposes, it goes without saying that improvements therein would be of benefit.

Accordingly, it is a broad object of the present invention to provide a novel and improved support system for a sheet-cutting machine of the kind that is normally wall-mounted.

It is a more specific object of the invention to provide a novel clamping unit for such a machine, which unit may be self-contained, and which provides firm and uniform positive clamping force along the length of the workpiece, operates smoothly and reliably, is of relatively simple construction, and is relatively inexpensive and facile to produce.

A similar specific object is to provide a novel rack unit for such a machine, which permits accurate orientation of the workpiece for producing cuts that are true and square, which is convenient to use, and which is of relatively simple, facile and inexpensive construction.

SUMMARY OF THE INVENTION

It has now been found that certain of the foregoing and related objects of the invention are attained by the provision of a novel, self-contained clamping unit comprising an elongated, rectilinear clamp member assembled with an elongated, rectilinear housing member. The housing member is of generally U-shaped cross-section, as taken in planes transverse to its longitudinal axis, and it is comprised of a top wall and two spaced, parallel, coextensive sidewalls extending along the length thereof. The clamp member has a portion, extending along its length, which is of generally U-shaped cross-section and is comprised of a bottom wall and two spaced, parallel, coextensive sidewalls. The bottom wall provides a workpiece contacting surface, and the sidewalls of the clamp member are closer to one another than are those of the housing member, the members being assembled with their sidewalls in edgewise confronting relationship.

The clamping unit also includes a plurality of rigid pivot arms, which are disposed between the sidewalls at spaced locations along the length of the unit. Each such arm is pivotally attached to the housing member and the clamp member, to permit parallel movement of the latter between a retracted position, substantially within the housing member, and positions extended therefrom. A like plurality of guide pins extend transversely between the sidewalls of the clamp member and through the pivot arms. Each pin consists of a shaft element, on one end of which is thin, flat head element having a low-friction outer surface; at least one head element is snugly interposed between the adjacent sidewalls of the clamp and housing members, on each side of the unit. A handle member is pivotally mounted on the housing member, and has an inner end portion therewithin and an outer end portion that is accessible for manual operation. The handle member is effectively interconnected to the clamp member by a rigid link member, so as to enable it to effect movement of the clamp member between its retracted and extended positions.

Other objects of the invention are attained by the provision of a novel rack unit for such a cutting machine, which includes a channel member comprised of spaced, forward and rearward walls defining a channel therebetween. The rearward wall is provided with at least one circular opening, and the forward wall has a window formed in it, which is in general alignment with the rearward wall opening. An elongated leveling bar, having means at one end for pivotally attaching it to a frame, is contained within the channel of the channel member. It has a flat upper surface, disposed at a level below the adjacent edges of the channel-defining walls and below an upper marginal edge defining the window in the forward wall, and it has at least one aperture in general alignment with the window and wall opening, spaced from the pivoted end thereof. An eccentric mounting fixture is provided which consists of a first part that is rotatably seated in the circular opening of the rearward wall, and a second part that has a shaft which extends through the aperture of the leveling bar and is engaged at one end with an inner end portion of the first part, at a point offset from its axis of rotation; means at the other end of the second part cooperates with the first part to clamp the bar effectively against the rearward wall. Thus, rotation of the first part will raise and lower the shaft of the second part to pivot the leveling bar, which can be affixed in any selected position by coaction of the two parts.

Additional objects of the invention are attainted by the provision of a novel support system, which includes a frame in combination with the above-described clamping unit and rack unit. The frame has backing structure which provides contact surfaces, normally lying in a generally vertical plane, and the clamping unit is disposed on the frame in a vertical orientation and forwardly of the generally vertical plane of the backing structure; the rack unit is also mounted on the frame forwardly of its vertical plane, but with its longitudinal axis oriented horizontally.

In preferred embodiments, the clamp member of the clamping unit will be of generally F-shaped cross-section, with the bottom wall having a portion extending laterally beyond one of the sidewalls of the U-shaped portion along the length thereof. The clamp member will desirably have a strip of resiliently compressible, high friction material extending along its length and on an outer surface thereof, to provide a workpiece contacting element, and the outer surface to which it is applied will advantageously be provided by the extended portion of the bottom wall of an F-shaped clamp member.

In most instances, there will be at least three pivot arms and associated guide pins, which will preferably be fabricated from a low friction, high-durability synthetic resinous material, and will have a head element on only one end. The head elements will desirably be thin and flat, and alternating in direction along the length of the unit; this will readily provide a balanced bearing system, and will afford smooth, non-binding movement of the clamp member within the housing member.

In especially desirable embodiments, each of the pivot arms will consist of a pair of identical elongated link components having opposite end portions with apertures through them, with one end portion being thicker than the other. The link components will be adapted for mirror image assembly with their like end portions matched, and the pivot arms so formed will be attached to the housing member and the clamp member through the resultant thicker and thinner end portions thereof, respectively; normally, the end portions of the link components will provide parallel outer faces to bear against the inside surfaces of the sidewalls.

Pivoting of the handle member between first and second positions will move the clamp member between its retracted and extended positions, respectively. The system will normally include means for exerting an endwise bias upon the clamp member, and the link member will advantageously be so configured and so attached to the handle member as to establish an over-center relationship in the retracted position of the clamp member; thus, the biasing means will tend to maintain the clamp member in its selected position, whether it is fully withdrawn or is in an extended, clamping position.

In preferred forms of the rack unit, the inner end portion of the "first" part of the mounting fixture will have a threaded bore that extends on an axis that is parallel to, but offset from, the axis of rotation, and the outer end portion thereof will be accessible, for engagement, on the exterior of the rearward wall of the channel member. The shaft of the "second" part will have a threaded end portion engaged in the bore of the first part, thereby providing the eccentric means for raising and lowering the associated leveling bar.

DETAILED DESCRIPTION OF THE ILLUSTRATED EMBODIMENTS

Figure 1:
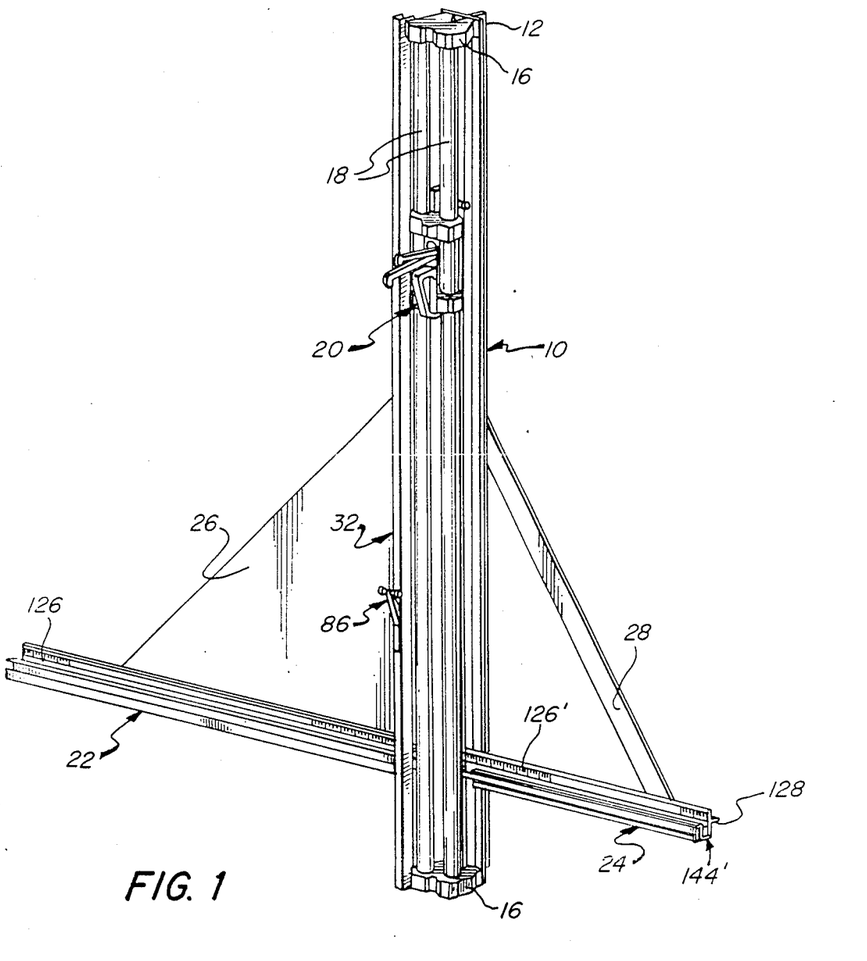
FIG. 1 is a perspective view of a sheet-cutting machine embodying the support system of the invention.

Turning now in detail to the drawings, FIG. 1 shows a sheet-cutting machine that employs the support system of the invention. The system includes a vertical extrusion, generally designated by the numeral 10, which provides a mounting flange 12 along the rear and an anvil member 14 along the front thereof (the latter being best seen in FIG. 10). The flange 12 provides means for connecting the brackets (not seen) by which the machine is mounted on the wall (typically, disposed at a 95° incline from horizontal); details of the anvil member are discussed in the above-identified Kozyrski patent. A pair of end brackets 16 are to the opposite ends of the vertical extrusion 10, and they mount two parallel, tubular guide rails 18. The rails 18 in turn slidably support a cutting head, generally designated by the numeral 20, the nature of which is also more fully described in the aforesaid Kozyrski patent.

Horizontal support members, or racks, generally designated by the numerals 22 and 24, respectively, extend coaxially in opposite directions from the vertical extrusion 10; they will be described in detail hereinbelow. A triangular face plate 26 is attached along two edges to the vertical extrusion 10 and the horizontal support 22, and serves not only to rigidify and strengthen the structure but also as a backing component for the workpiece to be cut. Similarly, a straplike brace 28 extends between the support 24 and the vertical extrusion. A self-containing clamping unit is attached at its opposite ends to the two brackets 16, to lie laterally adjacent, and parallel to, the vertical center line of the machine, as defined by the anvil groove 30, which is disposed on a medial axis between the guide rails 18 and cooperates with the cutting element of the head 20, which runs therealong on the rails.

Referring now more particularly to FIGS. 2–9, the clamping unit consists of a U-shaped housing, generally designated by the numeral 32, and an F-shaped clamp member, generally designated by the numeral 34 (the shapes of the housing and clamp member being as taken in planes transverse to the longitudinal axes thereof). Both members are of uniform cross section along their entire lengths, and may be fabricated as metal extrusions.

Figure 2:
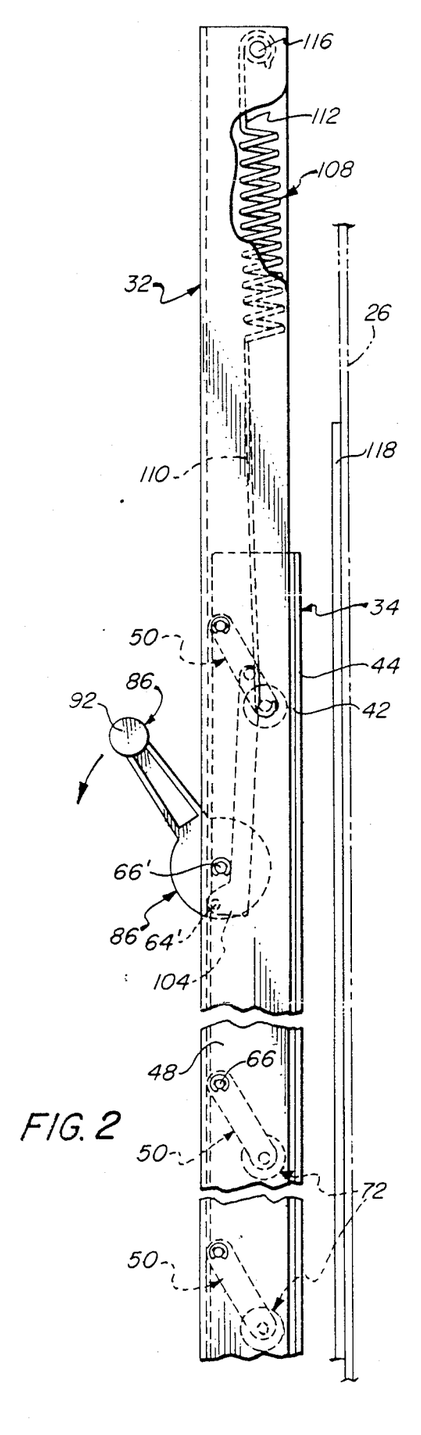
FIG. 2 is a fragmentary side elevational view of the clamping unit employed in the system of FIG. 1, with portions broken away to show internal features and with the clamp member in its retracted position, the Fig. also showing a workpiece and (in phantom) backing structure.
Figure 3:
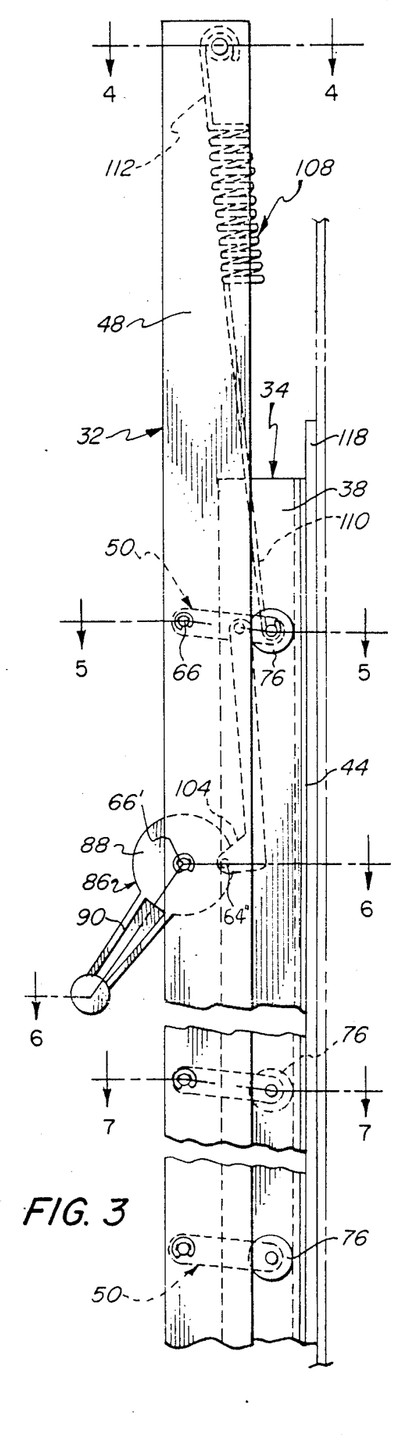
FIG. 3 is a view similar to FIG. 2, showing the clamping member in an extended position.

The clamp member consists of parallel sidewalls 36, 38, and a bottom wall 40 which has a portion 42 extending laterally beyond the sidewall 38; the extending portion carries a strip 44 of resilient, high-friction material (e.g., a compressible foamed synthetic polymer) on its outer face, to provide a padded contact surface for engagement of the workpiece 118. The housing member 32 consists of a top wall 46 and a pair of parallel sidewalls 48, which are spaced a distance somewhat greater than the distance between sidewalls 36, 38 of the clamp member 34, the latter being received between the walls 48 in edgewise, confronting relationship.

Figure 9:
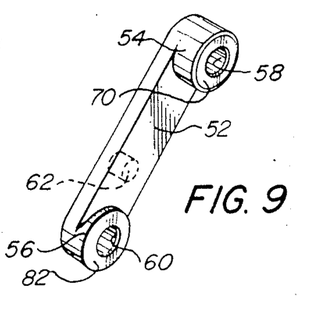
FIG. 9 is a perspective view of a pivot arm link component employed therein.

The members 32, 34 are joined to one another by three pivot arms, each of which consists of a mated pair of rigid links, generally designated by the numeral 50 and most fully illustrated in FIG. 9. As can be seen, each link 50 consists of a bar portion 52, which has collar elements 54, 56 at its opposite ends, both collar elements extending in the same direction but one (element 54)

being substantially thicker than the other (element 56). Apertures 58, 60 extend through the elements 54, 56, respectively, and a third aperture 62 is formed in the bar portion 52 at a point intermediate its ends.

Figure 5:
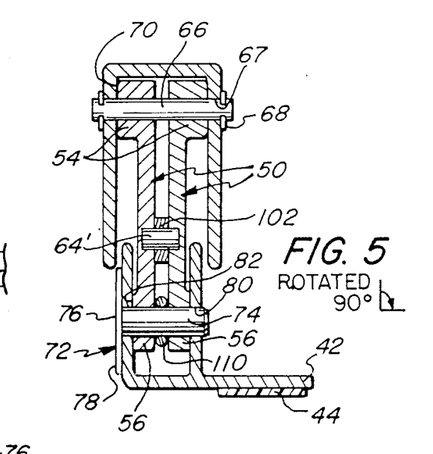
Figure 6:
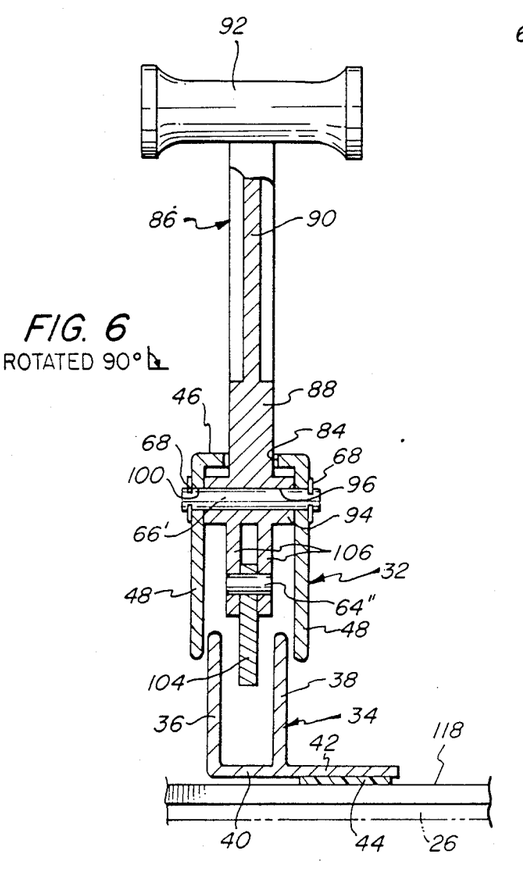
Figure 7:
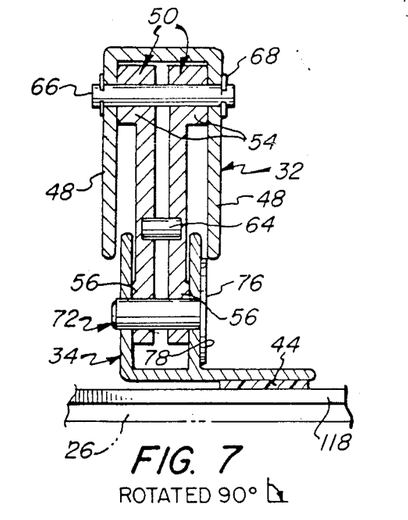

As best seen in FIGS. 5 and 7, the links 50 are assembled in pairs with the corresponding collar elements 54 and 56 mated with one another and extending outwardly; a short pin 64 has its opposite ends engaged within the apertures 62 of the assembled links, to tie them together. The wider end of each pivot arm couple is received within the housing member 32, and is pivotably mounted therein by an axle pin 66, which passes through holes 67 in the walls 48 and is secured by suitable retaining rings 68 on its opposite ends; in assembly, the end faces 70 on the collar elements 54 bear against the inside surfaces of the sidewalls.

Figures 4, 8:
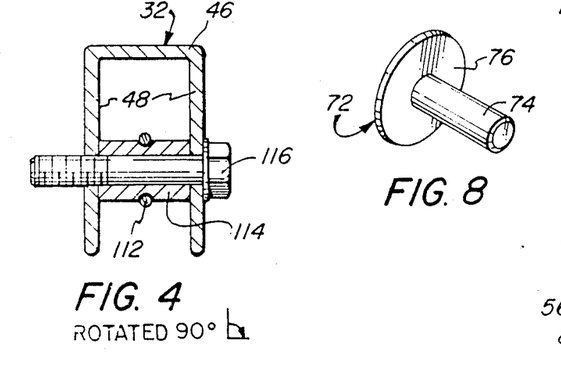
FIGS. 4, 5, 6 and 7 are sectional views taken, respectively, along lines 4—4, 5—5, 6—6 and 7—7 of FIG. 3, each Fig. being rotated through an angle of 90° about the longitudinal axis of the unit.
FIG. 8 is a perspective view of a guide pin utilized in the clamping unit.

The narrower ends of the pivot arm couples, provided by the collar elements 56, are received between the sidewalls 36, 38 of the clamp member 34, and are pivotably secured therein by guide pins, generally designated by the numeral 72 and most fully illustrated in FIG. 8. As can be seen, the pin 72 consists of a shaft portion 74 and a relatively thin, large diameter head portion 76; generally, it will be integrally formed as a single piece from a low-friction, hard and durable synthetic resinous material, such as a polycarbonate plastic. The guide pins are inserted through holes 80 in the sidewalls 36, 38, and through the aligned apertures 60 of the paired link components 50, to secure them in place with their annular end surfaces 82 bearing upon the inside surfaces of the sidewalls.

As is best seen in FIG. 3, the three guide pins 72 are inserted through the sidewalls 36, 38 in alternating directions along the length of the clamp member 34. Consequently, the outer surface 78 of the head 76 on at least one guide pin will be disposed to bear upon the inside surface of each of the two sidewalls 48 of the housing member 32, rendering the head portions functional both as spacers and also as bearing elements; this will provide a well-balanced bearing system, to ensure smooth and reliable relative movement between the members 32 and 34.

The top wall 46 of the housing member 32 has a rectangular slot 84 formed therein, through which extends an operating handle, generally designated by the numeral 86. The handle includes a circular inner portion 88 and a radially extending shank portion 90, the latter having a knob 92 on its outer end to permit facile gripping. Hub elements 94 are defined on each side of the circular portion 88, and a bore 96 passes transversely through the handle thereat. An axle pin 66 extends through the bore 96 and through a pair of aligned holes 100 in the sidewalls 48, thereby serving to pivotably mount the operating handle 86 on the housing member 32; the axle is secured by retaining rings 68.

A long link, disposed within the clamping unit, has its shaft portion 102 pivotably connected at one end to the pin 64' joining the link components 50 of the uppermost pivot arm couple, shown in FIG. 5. A head portion 104 at the opposite end of the long link is pivotably attached to the circular portion 88 of the operating handle 86 by pin 64", extending transversely through appropriate apertures; as will be noted in FIG. 6, the innermost section of the circular portion 88 is formed with spaced flange elements 106 for receipt of the head portion 104.

A coil spring, generally designated by the numeral 108, is contained within the housing member 32, and has one end 110 engaged about the guide pin 72 associated with the uppermost pivot arm couple (shown in FIG. 5). The opposite end 112 of the spring 108 is engaged about a spacer 114, which is held between the walls 48 at the extreme upper end of the housing member by a transverse bolt 116. The bolt 116 extends beyond the housing member sidewall, and is engaged within the upper bracket 16 on the vertical extrusion 10; a similar bolt passes through the lower extremity of the housing member 32 into the lower bracket 16, the bolts 116 thus serving to assemble the clamping unit with the other parts of the support system.

As seen in FIG. 2, in the fully retracted position of the clamp member 34 the point of pivotable connection between the link 102 and the handle 86 (as represented by the pin 64') lies in an over-center relationship to the axis of the pivoting of the handle 86 (as represented by the pin 66'); thus, the spring 108, acting through the uppermost pivot arm couple, tends to maintain that position. Moving the handle 86 from the position shown in FIG. 2 to that of FIG. 3 serves of course to swing the connected arm couple outwardly, thereby forcing the strip 44 on the clamp member 32 (constrained by the other arm couples to parallel movement) into contact with the surface of the workpiece 118, to hold it firmly against the surface of the face plate 26. It will be appreciated that the offset from the centerline of the clamping unit, proivded by the extended portion 42 of the clamp member 34, is desirable from the standpoint of placing the zone of contact as close as possible to the axis of cutting, as represented by the anvil groove 30.

Figures 10, 11, 12:
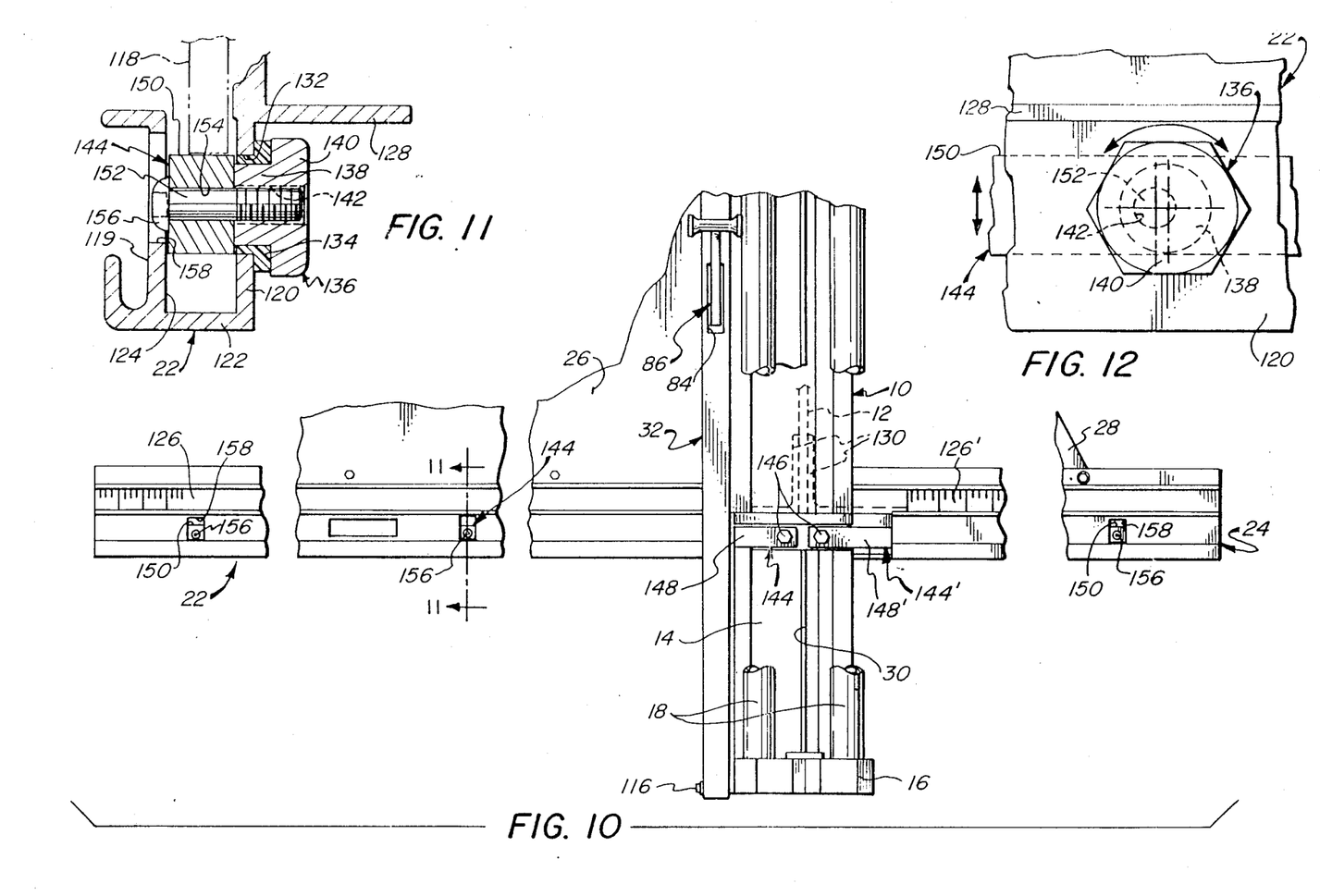
FIG. 10 is a fragmentary plan view of the lower portion of the system of FIG. 1, with portions broken away to show underlying features, and drawn to a scale enlarged therefrom.
FIG. 11 is a sectional view taken along line 11—11 of FIG. 10, and drawn to a scale further enlarged therefrom.
FIG. 12 is a fragmentary rear view of the same section of the machine as is depicted in FIG. 11, and drawn to the scale thereof.

With particular reference now to FIGS. 10-12, it should be noted initially that the support members 22 and 24, and the associated components, are virtually the same, except for differences in length and other features that are dictated by the opposing directions of their extension. FIG. 11 best shows the cross-sectional configuration of the support members 22, 24, which are seen to be of generally U-shaped cross section and to include a forward wall 119, a rearward wall 120, and a bottom wall 122, together defining an elongated, upwardly-opening channel 124 along the length of the member. A distance scale 126 extends along the rearward wall of member 22, and is marked to denote distances from the centerline of the machine; as will be appreciated, the distance scale 126' on the rearward wall of support member 24 is graudated in the opposite sense. The extrusions providing the support members 22, 24 also include a rearwardly extending flange 128, by which they are mounted to the vertical extrusion 10, utilizing the angle brackets 130 attached to the mounting flange 12 thereon.

The rearward wall 120 of the support member 22 has two circular openings 132 along its length, one of which is shown in FIG. 11 and the other of which is not visible; the member 24 has one such opening, which is also not visible. A steel spacer 134 is seated in each of the openings 132 with its cylindrical portion extending therethrough, which in turn receives an eccentric hex nut, generally designated by the numeral 136. The hex nut 136 has a cylindrical inner end portion 138 that is rotatably mounted within the circular opening of the spacer 134, and it has a head portion 140 of hexagonal configuration (see FIG. 12) that is accessible at the back of the rearward wall 120. Extending into the nut 136, from its inner end, is a threaded bore 142, which is on an axis offset from the axis of rotation of the nut; as indicated in FIG. 12, the cross marks on the right designate the axis of rotation (the center of the cylindrical portion 138 of the nut), and those on the left designate the axis of the bore 142.

A rectilinear squaring edge bar, generally designated by the numeral 144, is contained within the channel 124 of the support member 22; a similar squaring edge bar 144' is contained within the member 24. Both bars are pivotably connected by nuts 146 passing through their inner end portions 148, 148' and into the vertical extrusion 10, and they have flat upper surfaces 150 along their entire lengths. The surfaces 150 are disposed below the upper edges of the forward and rearward walls 119, 120, and they serve of course to seat the edge of the sheet material workpiece 118, which is to be cut in the machine. The portions of the bars 144, 144' lying outwardly of their pivotal ends 148, 148' are supported by button-head screws 152, which extend through apertures 154 therein and into the offset bores 142 in the hex nuts 136; the heads 156 of the screws 152 are formed with hexagonal recesses for engaging a wrench.

Proper orientation of the squaring edge bars 144, 144' is readily achieved by adjustment of the hex nuts 136. With the cap screws 152 loosened sufficiently, the nuts 136 can be turned within the apertures 132 and spacers 134, so as to cause the screws 152 to revolve on a small radius arc about the axis of rotation of the nut. This will of course cause the squaring edge bars to pivot slightly on the bolt 146, so as to achieve optimal squareness relative to the vertical axis. When the desired orientations have been achieved, it is simply a matter of tightening the screws 152 to clamp the bars 144, 144' against the rearward walls 120 of the support members 22, 24. Because the bar 144 is relatively long (i.e., typically about four feet), it is desirable to provide two points of support, and associated eccentric fixtures, along its length, to counteract any tendency for bowing that would otherwise occur.

The forward walls 118 are formed with small rectangular windows 158, each of which is aligned with an aperture 132 in the rearward walls 120. It will be noted from FIG. 11 that the upper edges 150 of the squaring edge bars are disposed beneath the margins defining the tops of the windows 158. This permits visual inspection of the relationship between the bottom edge of the workpiece 118 and the top edges of the squaring edge bars, any gaps therebetween serving to clearly show, in a most direct and convenient way, imprecise alignment and hence a need for readjustment.

Thus, it can be seen that the present invention provides a novel and improved support system for a wall-mounted sheet-cutting machine, including unique clamping and rack units. The clamping unit may be self-contained, and provides firm and uniform positive clamping force along the length of the workpiece; it operates smoothly and reliably, is of relatively simple construction, and is relatively inexpensive and facile to produce. The rack unit permits accurate orientation of the workpiece, for producing cuts that are true and square, and it is convenient to use and is of relatively simple, facile and inexpensive construction.

Having thus described the invention, what is claimed is:

1. A wall-mounted support system for a sheet-cutting machine, comprising:
   a frame having backing structure providing contact surfaces disposed in a generally vertical plane with said system in its normal, wall-mounted orientation;
   an elongated clamping unit disposed on said frame forwardly of said generally vertical plane with its longitudinal axis vertically oriented, said clamping unit comprising:
   (a) an elongated, rectilinear housing member of generally U-shaped cross-section, as taken in planes transverse to its longitudinal axis, comprised of a top wall and two spaced, parallel, coextensive sidewalls extending along the length thereof;
   (b) an elongated, rectilinear clamp member assembled with said housing member and having a portion, extending along its entire length, that is of generally U-shaped cross-section, as taken in said transverse planes, said portion being comprised of a bottom wall and two spaced, parallel, coextensive sidewalls extending along the length thereof, the spacing of said clamp member sidewalls being less than that of said housing member sidewalls, and said clamp member sidewalls being received between said housing member sidewalls in edgewise confronting relationship, said clamp member having a clamping contact surface outwardly disposed on said bottom wall;
   (c) a plurality of rigid pivot arms disposed in the space between said sidewalls of said clamp member at spaced locations along the length of said unit, each of said arms being pivotably attached to said housing member and said clamp member to permit parallel movement of said clamp member between a retracted position, substantially within said housing member, and positions extended therefrom;
   (d) a like plurality of guide pins extending transversely between said sidewalls of said clamp member and inserted through said pivot arms for pivotable attachment thereof, each of said pins having a shaft element and a head element on at least one end thereof, said head elements having low-friction outer surfaces thereon, and at least one of said head elements being interposed between the adjacent sidewalls of said clamp and housing members on each side of said unit;
   (e) a handle member pivotably mounted on said housing member and having an inner end portion therewithin and an outer end portion accessible for manual operation; and
   (f) a rigid link member effectively interconnecting said handle member to said clamp member, so as to enable said handle member to effect movement of said clamp member between said retracted and extended positions thereof; and
   an elongated rack unit mounted on said frame forwardly of said vertical plane with its longitudinal axis horizontally oriented and parallel to said plane, said rack unit comprising:
   (g) an elongated channel member attached to said frame and comprised of spaced, upstanding forward and rearward walls defining an upwardly opening channel therebetween, said rearward wall having at least one circular opening therein and said forward wall having an upper edge and a window therethrough below said upper edge and in general alignment with said opening of said rearward wall;
   (h) an elongated leveling bar pivotably attached at one end, operatively to said frame, and contained within said channel of said channel member, said bar having a flat upper surface at a level below said upper edge of said forward wall and an upper marginal edge defining said forward wall window, and having at least one aperture therethrough spaced from said one end of said bar and in general alignment with said window and opening of said forward and rearward walls, respectively; and (i) an eccentric mounting fixture, including a first part rotatably seated in said circular opening of said rearward wall for rotation about an axis through the center of said opening, and a second part having opposite ends and a shaft therebetween extending through said aperture of said leveling bar on an axis parallel to said axis of rotation, said second part being engaged at one end with an inner end portion of said first part at a point offset from the axis of rotation thereof, and having means at its other end for cooperating with said first part to clamp said bar against said rearward wall; whereby rotation of said first part will raise and lower said shaft of said second part to pivot said bar, and whereby said bar can be clamped in selected positions against said rearward wall by coaction of said first and second parts.

2. The system of claim 1, wherein said clamping unit is self-contained and is disengageably mounted on said frame, and wherein said housing member has means thereon for so mounting said unit.

3. The system of claim 1, wherein said clamp member is of generally F-shaped cross-section, as taken in said transverse planes, said bottom wall having a portion extending laterally beyond one of said sidewalls of said U-shaped portion, along the length thereof.

4. The system of claim 3, wherein said clamp member includes a strip of resiliently compressible material on the outer surface of said extending bottom wall portion, along the length thereof, said strip providing said contact surface.

5. The system of claim 1, wherein said plurality constitutes at least three of said pivot arms and guide pins.

6. The system of claim 1, wherein said guide pins are fabricated from a low friction, high-durability synthetic resinous material and have said head element on only one end of said shaft thereof, each of said head elements being thin and flat and snugly interposed between said adjacent sidewalls, the direction of transverse extension of said pins alternating along the length of said unit to provide a balanced bearing system to afford smooth, non-binding movement of said clamp member within said housing member.

7. The system of claim 1, wherein each of said pivot arms consists of a pair of identical elongated link components having opposite end portions with apertures therethrough, one of said end portions of each of said link components being thicker than the other, and said link components being adapted for mirror image asembly with their like end portions matched, said arms being attached to said housing member and said clamp member through the resultant thicker and thinner end portions thereof, respectively.

8. The system of claim 7, wherein said end portions of said link components provide parallel outer faces on said arms, said faces bearing against the inside surfaces of said housing member and clamp member sidewalls.

9. The system of claim 1 wherein said handle member is pivotable between first and second positions in which said clamp member is in its retracted and extended positions, respectively, and wherein said system additionally includes biasing means for exerting a force acting longitudinally to bias said clamp member toward one end of said housing, said link member being pivotably attached to said inner end portion of said handle member at a location offset from the axis of pivoting of said handle member, and being so configured that, in said retracted position of said clamp member, a relationship exists between said location of attachment of said link member and the axis of pivoting of said handle member in which said biasing means tends to maintain said clamp member in said retracted position, as well as in extended positions, thereof.

10. The system of claim 1, wherein said inner end portion of said first part of said mounting fixture has a threaded bore extending thereinto on an axis parallel to, but offset from, said axis of rotation, and wherein said shaft of said second part has a threaded end portion engaged in said bore of said first part, said first part also having an outer end portion accessible, for engagement, on the exterior of said rearward wall.

11. The system of claim 1, wherein said frame has a central vertical axis, wherein said clamping unit is disposed proximate and parallel to said central axis, wherein said one end of said rack unit is disposed adjacent said central axis and said rack unit extends in one direction therefrom away from said axis, and wherein said system includes a second said rack unit disposed on the other side of said axis from said first-mentioned rack unit, said one end of said second rack unit also being disposed adjacent said central axis, said second rack unit extending away from said axis in the opposite direction from, but coaxially with, said first-mentioned rack unit, each of said rack units having an associated distance scale running along said channel thereof, permitting determinations of distances from said central axis to be made in both of said directions.

12. A self-contained clamping unit, adapted for installation in a wall-mounted cutting machine for cooperatively securing sheet-like workpieces therein, said clamping unit comprising:

(a) an elongated, rectilinear housing member of generally U-shaped cross-section, as taken in planes transverse to its longitudinal axis, comprised of a top wall and two spaced, parallel, coextensive sidewalls extending along the length thereof;

(b) an elongated, rectilinear clamp member assembled with said housing member and having a portion, extending along its entire length, that is of generally U-shaped cross-section, as taken in said transverse planes, said portion being comprised of a bottom wall and two spaced, parallel, coextensive sidewalls extending along the length thereof, the spacing of said clamp member sidewalls being less than that of said housing member sidewalls, and said clamp member sidewalls being received between said housing member sidewalls in edgewise confronting relationship, said clamp member having a clamping contact surface outwardly disposed on said bottom wall;

(c) a plurality of rigid pivot arms disposed in the space between said sidewalls of said clamp member at spaced locations along the length of said unit, each of said arms being pivotably attached to said housing member and said clamp member to permit parallel movement of said clamp member between a retracted position, substantially within said housing member, and positions extended therefrom;

(d) a like plurality of guide pins extending transversely between said sidewalls of said clamp member and inserted through said pivot arms for pivotable attachment thereof, each of said pins having a shaft element and a thin, flat head element on one end thereof with a low-friction outer surface thereon, at least one of said head elements being snugly interposed between the adjacent sidewalls of said clamp and housing members on each side of said unit;

(e) a handle member pivotably mounted on said housing member and having an inner end portion therewithin and an outer end portion accessible for manual operation; and (f) a rigid link member effectively interconnecting said handle member to said clamp member, so as to enable said handle member to effect movement of said clamp member between said retracted and extended positions thereof.

13. The unit of claim 12, wherein said clamp member is of generally F-shaped cross-section, as taken in said transverse planes, said bottom wall having a portion extending laterally beyond one of said sidewalls of said U-shaped portion of said clamp member, along the length thereof.

14. The unit of claim 13, wherein said clamp member includes a strip of resiliently compressible material on the outer surface of said extending bottom wall portion, along the length thereof, said strip providing said contact surface.

15. The unit of claim 12, wherein said plurality constitutes at least three of said pivot arms and guide pins, the direction of said pins alternating along the length of said unit to provide a balanced bearing system to afford smooth, non-binding movement of said clamp member within said housing member.

16. The unit of claim 15, wherein said guide pins are fabricated from a low-friction, high-durability synthetic resinous material.

17. The unit of claim 12, wherein each of said pivot arms consists of a pair of identical, elongated link components having opposite end portions providing parallel outer faces on said arms and having apertures therethrough, one of said end portions of each of said link components being thicker than the other, and said link components being adapted for mirror image assembly with their like end portions matched, said arms being attached to said housing member and said clamp member through the resultant thicker and thinner end portions thereof, respectively, with said faces bearing against the inside surface of said housing member and clamp member sidewalls.

18. The unit of claim 12 wherein said handle member is pivotable between first and second positions in which said clamp member is in its retracted and extended positions, respectively, and wherein said system additionally includes biasing means for exerting a force acting longitudinally to bias said clamp member toward one end of said housing, said link member being pivotably attached to said inner end portion of said handle member at a location offset from the axis of pivoting of said handle member, and being so configured that, in said retracted position of said clamp member, a relationship exists between said location of attachment of said link member and the axis of pivoting of said handle member in which said biasing means tends to maintain said clamp member in said retracted position, as well as in extended positions, thereof.

19. A rack unit for a wall-mounted cutting machine, adapted for supporting sheet-like workpieces therein, said rack unit comprising:

(a) an elongated channel member comprised of spaced, forward and rearward walls defining a channel therebetween, said rearward wall having at least one circular opening therein and said forward wall having an upper edge and a window therethrough below said upper edge and in general alignment with said opening of said rearward wall;

(b) an elongated leveling bar having means at one end for pivotably attaching said bar to a frame, and contained within said channel of said channel member, said bar having a flat upper surface at a level below said upper edge of said forward wall and an upper marginal edge defining said forward wall window, and having at least one aperture therethrough spaced from said one end of said bar and in general alignment with said window and opening of saidforward and rearward walls, respectively; and (c) an eccentric mounting fixture, including a first part rotatably seated in said circular opening of said rearward wall for rotation about an axis through the center of said opening, and a second part having opposite ends and a shaft extending therebetween through said aperture of said leveling bar on an axis parallel to said axis of rotation, said second part being engaged at one end with an inner end portion of said first part at a point offset from the axis of rotation thereof, and part having means at its other end for cooperating with said first part to clamp said bar against said rearward wall, whereby rotation of said first part will raise and lower said shaft of said second part to pivot said bar, and whereby said bar can be clamped in selected positions against said rearward wall by coaction of said first and second parts.

20. The unit of claim 19, wherein said inner end portion of said first part of said mounting fixture has a threaded bore extending thereinto on an axis parallel to, but offset from, said axis of rotation, and wherein said shaft of said second part has a threaded end portion engaged in said bore of said first part, said first part also having an outer end portion accessible, for engagement, on the exterior of said rearward wall.

* * * * *

UNITED STATES PATENT AND TRADEMARK OFFICE
CERTIFICATE OF CORRECTION

PATENT NO. : 4,892,020

DATED : January, 9, 1990

INVENTOR(S) : Vincent T. Kozyrski et al

It is certified that error appears in the above-identified patent and that said Letters Patent is hereby corrected as shown below:

Claim 3, line 35, column 9, insert after the word "portion" -- of said clamp member--.

Signed and Sealed this

Twenty-second Day of January, 1991

*Attest:*

HARRY F. MANBECK, JR.

*Attesting Officer*  *Commissioner of Patents and Trademarks*